US011361249B2

(12) United States Patent
Yuki

(10) Patent No.: US 11,361,249 B2
(45) Date of Patent: Jun. 14, 2022

(54) IMAGE PROCESSING DEVICE FOR MACHINE LEARNING AND SETTING OF A TEACHING SIGNAL IN ACCORDANCE WITH DETECTION AND TARGET REGIONS, IMAGE PROCESSING METHOD FOR MACHINE LEARNING AND SETTING OF A TEACHING SIGNAL, AND STORAGE MEDIUM

(71) Applicant: NEC Corporation, Tokyo (JP)

(72) Inventor: Masato Yuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/483,785

(22) PCT Filed: Mar. 2, 2018

(86) PCT No.: PCT/JP2018/007939
§ 371 (c)(1),
(2) Date: Aug. 6, 2019

(87) PCT Pub. No.: WO2018/168515
PCT Pub. Date: Sep. 20, 2018

(65) Prior Publication Data
US 2019/0392347 A1 Dec. 26, 2019

(30) Foreign Application Priority Data
Mar. 14, 2017 (JP) .............................. JP2017-048321

(51) Int. Cl.
*G06T 7/11* (2017.01)
*G06N 20/00* (2019.01)
(Continued)

(52) U.S. Cl.
CPC ................ *G06N 20/00* (2019.01); *G06T 7/11* (2017.01); *G06T 7/149* (2017.01); *G06T 7/60* (2013.01);
(Continued)

(58) Field of Classification Search
CPC .......... G06N 20/00; G06N 20/10; G06N 3/08; G06T 7/11; G06T 7/149; G06T 7/97;
(Continued)

(56) References Cited

U.S. PATENT DOCUMENTS

| 2014/0270350 A1* | 9/2014 | Rodriguez-Serrano ...................... G06K 9/6267 382/103 |
| 2015/0283701 A1* | 10/2015 | Izhikevich ............. G06N 3/008 700/250 |
| 2016/0063398 A1* | 3/2016 | Zhang ................. G06F 11/3466 706/12 |

FOREIGN PATENT DOCUMENTS

| JP | H07-239939 A | 9/1995 |
| JP | 2012-123642 A | 6/2012 |

(Continued)

OTHER PUBLICATIONS

International Search Report for PCT Application No. PCT/JP2018/007939, dated May 22, 2018.

*Primary Examiner* — Siamak Harandi
(74) *Attorney, Agent, or Firm* — Sughrue Mion, PLLC

(57) ABSTRACT

Provided is an image processing device having an acquisition unit that acquires an image for learning used for machine learning; a target region setting unit that sets, to the image, a target region including a detection target; a detection region setting unit that sets, to the image, a detection region in which a teaching signal is required to be set; and a teaching signal setting unit that sets, to the detection region, a teaching signal that may take three or more values
(Continued)

in accordance with a relevance between the detection region and the target region.

9 Claims, 9 Drawing Sheets

(51) Int. Cl.
    *G06T 7/00*          (2017.01)
    *G06T 7/149*       (2017.01)
    *G06T 7/60*         (2017.01)

(52) U.S. Cl.
    CPC ...... *G06T 7/97* (2017.01); *G06T 2207/20081* (2013.01)

(58) Field of Classification Search
    CPC ............ G06T 2207/20081; G06T 7/60; G06K 9/6203; G06K 9/3233
    See application file for complete search history.

(56) References Cited

FOREIGN PATENT DOCUMENTS

| | | | | |
|---|---|---|---|---|
| JP | 2012-128638 | * | 7/2012 | ............... G06T 7/00 |
| JP | 2013-065156 A | | 4/2013 | |
| JP | 5769559 | * | 8/2015 | ............... G06T 7/60 |

\* cited by examiner

FIG. 8

| REGION NAME | TEACHING SIGNAL |
|---|---|
| REGION 1 | 0.001 |
| REGION 2 | 0.001 |
| REGION 3 | 0.001 |
| REGION 4 | 0.001 |
| REGION 5 | 0.752 |
| REGION 6 | 0.603 |
| REGION 7 | 0.001 |
| REGION 8 | 0.853 |
| REGION 9 | 0.589 |

IMAGE PROCESSING DEVICE FOR MACHINE LEARNING AND SETTING OF A TEACHING SIGNAL IN ACCORDANCE WITH DETECTION AND TARGET REGIONS, IMAGE PROCESSING METHOD FOR MACHINE LEARNING AND SETTING OF A TEACHING SIGNAL, AND STORAGE MEDIUM

This application is a National Stage Entry of PCT/JP2018/007939 filed on Mar. 2, 2018, which claims priority from Japanese Patent Application 2017-048321 filed on Mar. 14, 2017, the contents of all of which are incorporated herein by reference, in their entirety.

TECHNICAL FIELD

The present invention relates an image processing device, an image processing method, and a storage medium.

BACKGROUND ART

The image recognition technology that automatically recognizes a specific object in an image is widely used. In the field of image recognition, machine learning that uses learning data and causes a computer to learn information required for automatic recognition has been proposed (See Patent Literature 1).

CITATION LIST

Patent Literature

PTL 1: Japanese Patent Application Laid-open No. H7-239939

SUMMARY OF INVENTION

Technical Problem

To detect an object present in a part of a large image, an image recognition method that selects a portion of an image and detects whether or not a detection target is included in the portion may be used. To perform machine learning corresponding to such an image recognition method, it is necessary to appropriately set a teaching signal to learning data used for machine learning.

The present invention has been made in view of the problem described above and intends to provide an image processing device that can set a teaching signal for machine learning more preferably.

Solution to Problem

According to one example aspect of the present invention, provided is an image processing device having an acquisition unit that acquires an image for learning used for machine learning; a target region setting unit that sets, to the image, a target region including a detection target; a detection region setting unit that sets, to the image, a detection region in which a teaching signal is required to be set; and a teaching signal setting unit that sets, to the detection region, a teaching signal that may take three or more values in accordance with a relevance between the detection region and the target region.

According to another example aspect of the present invention, provided is an image processing method having steps of: acquiring an image for learning used for machine learning; setting, to the image, a target region including a detection target; setting, to the image, a detection region in which a teaching signal is required to be set; and setting, to the detection region, a teaching signal that may take three or more values in accordance with a relevance between the detection region and the target region.

According to yet another example aspect of the present invention, provided is a storage medium storing a program that cause a computer to execute steps of: acquiring an image for learning used for machine learning; setting, to the image, a target region including a detection target; setting, to the image, a detection region in which a teaching signal is required to be set; and setting, to the detection region, a teaching signal that may take three or more values in accordance with a relevance between the detection region and the target region.

Advantageous Effects of Invention

According to the present invention, it is possible to provide an image processing device that can set a teaching signal used for machine learning more preferably.

BRIEF DESCRIPTION OF DRAWINGS

FIG. 8 is a table illustrating a setting example of a teaching signal according to the first example embodiment.

DESCRIPTION OF EMBODIMENTS

Figure 1:
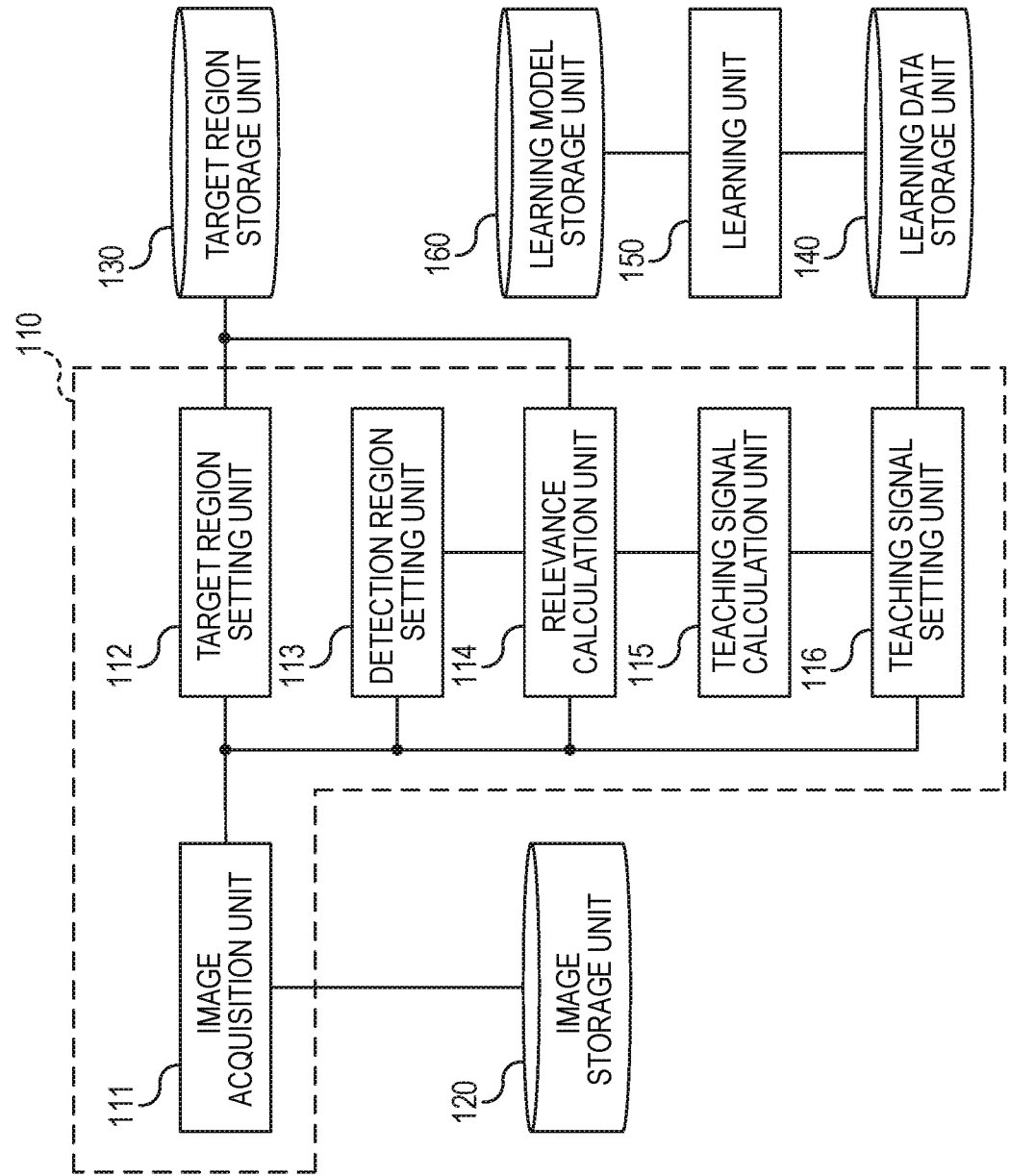
FIG. 1 is a block diagram illustrating the general configuration of a machine learning system according to a first example embodiment.

Exemplary example embodiments of the present invention will be described below with reference to the drawings. Components having the same function are labelled with the same references in the drawings, and the description thereof may be omitted or simplified.

First Example Embodiment

FIG. 1 is a block diagram illustrating the general configuration of a machine learning system according to a first example embodiment. The machine learning system according to the present example embodiment is a system that generates data for learning (learning data) to automatically perform learning for detecting a detection target included in an image and performs machine learning by using the generated learning data. The machine learning system has a learning data generation unit 110, an image storage unit 120, a target region storage unit 130, a learning data storage unit 140, a learning unit 150, and a learning model storage unit 160. The learning data generation unit 110 has an image acquisition unit 111, a target region setting unit 112, a detection region setting unit 113, a relevance calculation unit 114, a teaching signal calculation unit 115, and a teaching signal setting unit 116. Note that the image acquisition unit 111 may be simply referred to as an acquisition unit.

Note that the machine learning system according to the present example embodiment may function as an image recognition system by further having an image recognition function that detects a detection target from an input image by using a learning result. Further, by generating learning data with a single device, the generation function of learning data and the learning function using the learning data may be formed as separate devices. Further, an image recognition system, a machine learning system, and a learning data generation device that may be included therein may be more generally referred to as an image processing device.

The image storage unit 120 stores one or more images for learning used for machine learning. The image acquisition unit 111 acquires an image for learning from the image storage unit 120. The target region setting unit 112 sets a target region including a detection target to the acquired image. The set target region is stored in the target region storage unit 130. The detection region setting unit 113 sets, to the acquired image, a detection region in which a teaching signal is to be set. The relevance calculation unit 114 calculates a relevance between a detection region and a target region in an image. The teaching signal calculation unit 115 calculates a teaching signal that may take three or more values corresponding to a relevance in accordance with a detection region. The teaching signal setting unit 116 sets a calculated teaching signal to a detection region and stores learning data including the teaching signal and an image in the learning data storage unit 140. The learning unit 150 performs machine learning using an image for which a teaching signal is set as learning data. An algorithm used for machine learning performed in the learning unit 150 may be, for example, deep learning, a Support Vector Machine (SVM), or the like. A learning model obtained by learning is stored in the learning model storage unit 160.

Figure 2:
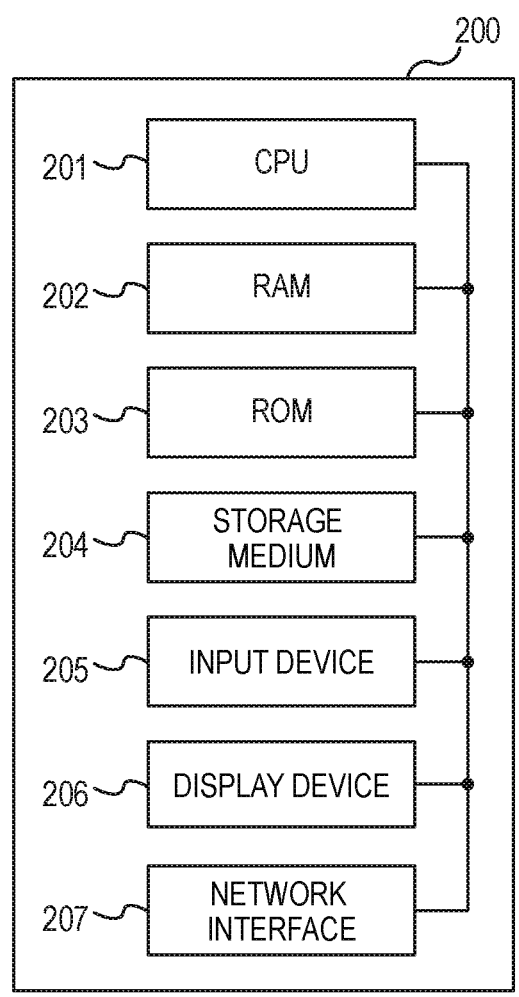
FIG. 2 is a block diagram illustrating a hardware configuration example of a computer forming the machine learning system according to the first example embodiment.

FIG. 2 is a block diagram illustrating a hardware configuration example of a computer 200 forming the machine learning system according to the first example embodiment. The computer 200 has a central processing unit (CPU) 201, a random access memory (RAM) 202, a read only memory (ROM) 203, a storage medium 204, an input device 205, a display device 206, and a network interface 207.

The CPU 201 performs a predetermined operation in accordance with a program stored in the ROM 203, the storage medium 204, or the like and also has a function for controlling each component of the computer 200. Further, the CPU 201 executes a program for implementing the function of each unit of the image acquisition unit 111, the target region setting unit 112, the detection region setting unit 113, the relevance calculation unit 114, the teaching signal calculation unit 115, the teaching signal setting unit 116, and the learning unit 150.

The RAM 202 provides a temporary memory region required for the operation of the CPU 201. The ROM 203 is formed of a nonvolatile memory and stores necessary information such as a program used for the operation of the computer 200. The storage medium 204 is a mass storage device such as a hard disk. The RAM 202 or the storage medium 204 provides a storage region for implementing the function of each unit of the image storage unit 120, the target region storage unit 130, the learning data storage unit 140, and the learning model storage unit 160.

The input device 205 is a keyboard, a mouse, a touch-screen, or the like and used by a user to operate the computer 200. The display device 206 is a liquid crystal display device or the like and used to display an image, a text, or the like. The network interface 207 is a communication interface based on a standard such as Ethernet (registered trademark), Wi-Fi (registered trademark), or the like and is a module for communicating with another device.

Note that the hardware configuration illustrated in FIG. 2 is an example, and devices other than the devices described above may be added, or some of the devices may not be provided. For example, some function may be provided by another device via a network, and the functions forming the present example embodiment may be distributed and implemented in a plurality of devices.

Figure 3:
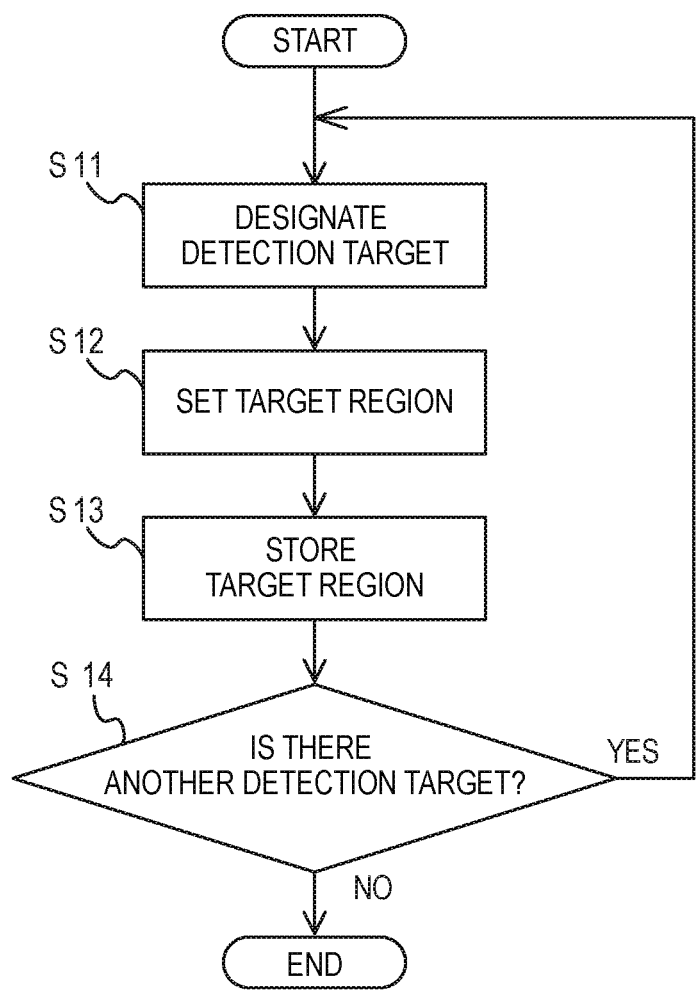
FIG. 3 is a flowchart illustrating a setting operation of a target region according to the first example embodiment.
Figure 4:
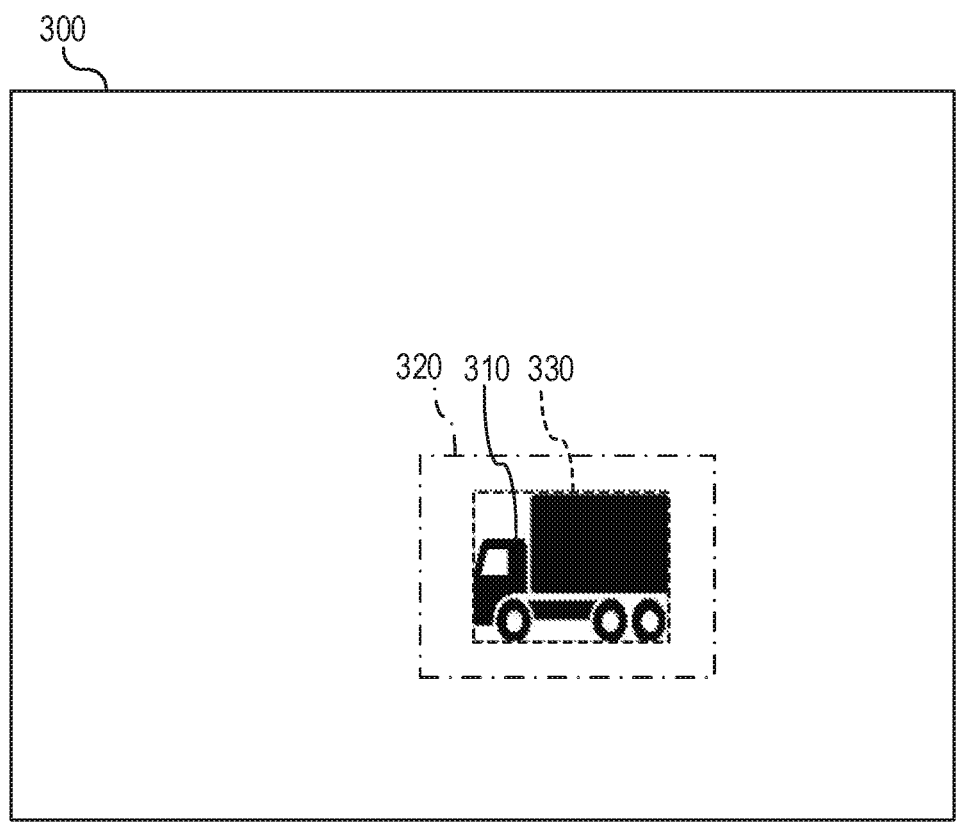
FIG. 4 is a diagram illustrating a setting example of the target region according to the first example embodiment.

Next, a setting operation of the target region will be described with reference to FIG. 3 and FIG. 4. FIG. 3 is a flowchart illustrating the setting operation of the target region according to the first example embodiment. The present setting operation is an operation performed by the target region setting unit 112 on an image for learning acquired from the image storage unit 120 by the image acquisition unit 111. FIG. 4 is a diagram illustrating a setting example of the target region according to the first example embodiment.

In step S11, the target region setting unit 112 receives input of a designated region 320 for an image 300. The designated region 320 is a region for designating a detection target 310 and is designated so as to include the detection target 310. In the example of FIG. 4, a rectangular designated region 320 is designated so as to include the image of a truck that is the detection target 310. The designation of the designated region 320 may be input by the user by using the input device 205, for example. Further, the designated region 320 may be designated by the CPU 201 reading information on the pre-set region from the storage medium 204 or the like. Note that, in the present specification, a rectangle means a quadrilateral in which all four corners are equal and includes a square.

In step S12, the target region setting unit 112 sets a target region 330 including the detection target 310 from the designated region 320. This process is performed by the target region setting unit 112 recognizing the external shape of the detection target 310 and selecting the shape of the target region 330 corresponding to the external shape by using a predetermined image processing algorithm. To improve detection accuracy, the shape of the target region 330 and the shape of the detection target 310 are preferably closed to each other. Therefore, the shape of the target region 330 is preferably a shape circumscribing the detection target 310. Further, to improve processing efficiency, the shape of the target region 330 is preferably as simple as possible. In particular, in the present example embodiment, since the detection target 310 is a truck and has a shape close to a rectangle, it is efficient that the shape of the target region 330 is also rectangular. Since the shape of an artifact is often close to a rectangle, it is preferable that the shape of the target region 330 be typically rectangular. Taking the above into consideration, in the example in FIG. 4, the shape of the target region 330 is a rectangle circumscribing the detection target 310. Note that, when an object other than a rectangle is to be detected, the shape of the target region 330 may be appropriately changed in accordance with the shape of the detection target 310.

In step S13, the target region setting unit 112 stores the target region 330 set in step S12 in the target region storage unit 130. In step S14, the CPU 201 determines whether or not there is another detection target 310 to be detected in the image 300. The determination may be, for example, based on input by the user or may be made by the CPU 201 reading information related to a pre-set region from the storage medium 204 or the like. If there is another detection target 310 to be detected (step S14, YES), the process of step S11 is again performed. If there is no other detection target 310 to be detected (step S14, NO), the setting operation of the target region 330 ends.

Figure 5:
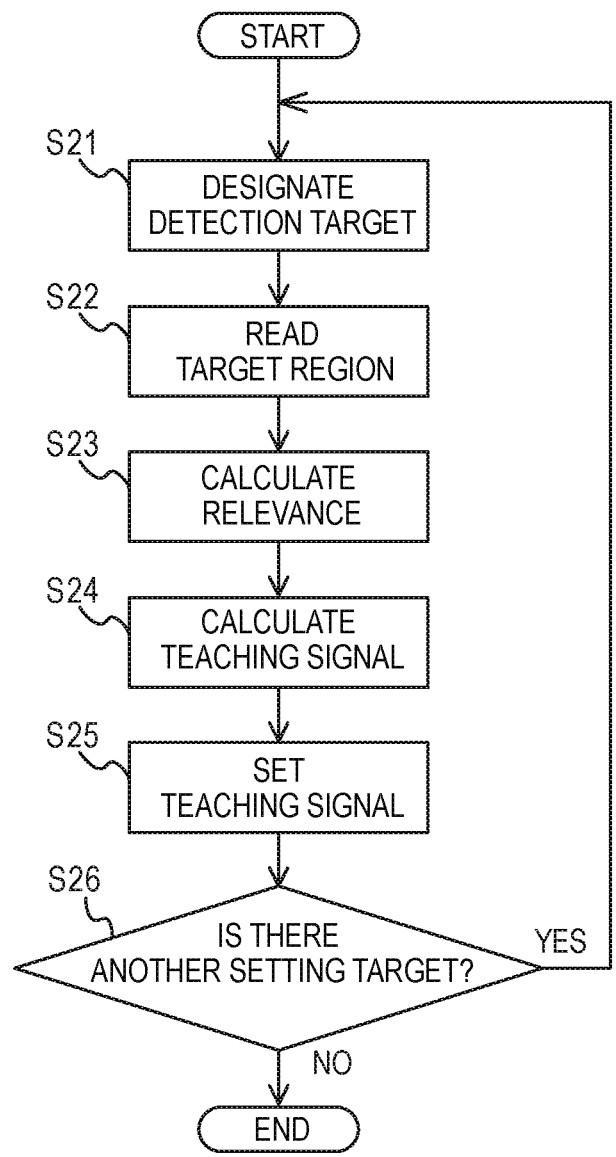
FIG. 5 is a flowchart illustrating a setting operation of a teaching signal according to the first example embodiment.
Figure 6:
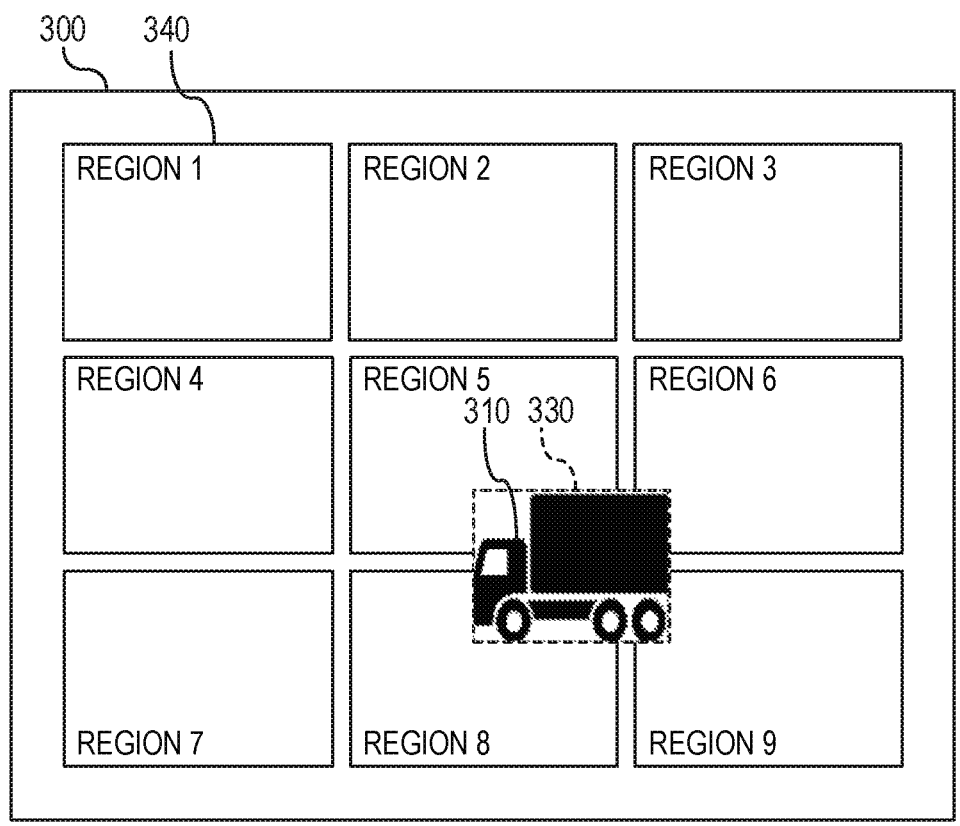
FIG. 6 is a diagram illustrating a setting example of a detection region according to the first example embodiment.
Figure 7:
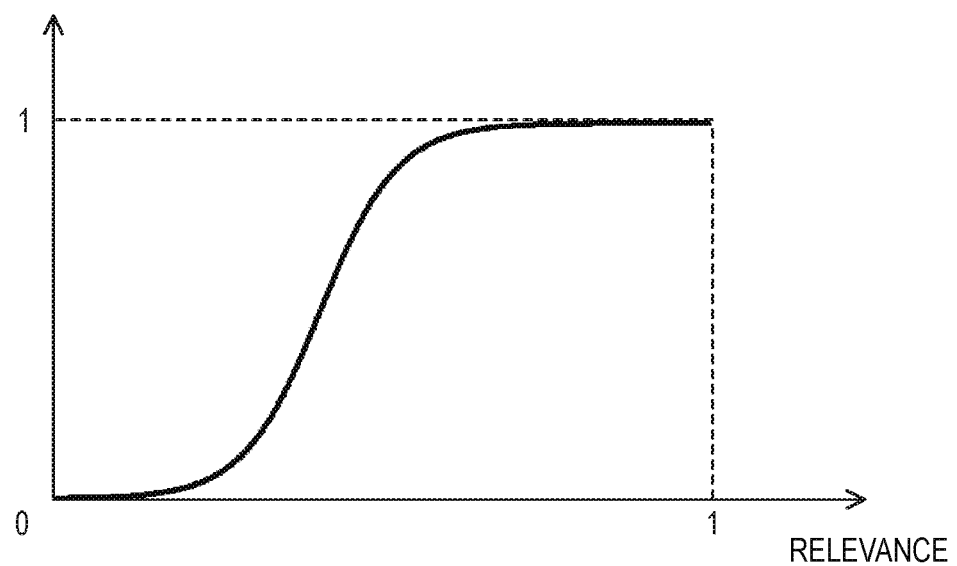
FIG. 7 is a graph illustrating relationship between the teaching signal and a relevance according to the first example embodiment.

Next, a setting operation of the detection region and a setting operation of the teaching signal will be described with reference to FIG. 5 to FIG. 8. FIG. 5 is a flowchart illustrating the setting operation of the teaching signal according to the first example embodiment. The present setting operation is an operation performed by the detection region setting unit 113, the relevance calculation unit 114, the teaching signal calculation unit 115, and the teaching signal setting unit 116 on the image for learning acquired by the image acquisition unit 111 from the image storage unit 120. FIG. 6 is a diagram illustrating a setting example of the detection region according to the first example embodiment. FIG. 7 is a graph illustrating a relationship between the teaching signal and a relevance according to the first example embodiment. FIG. 8 is a table illustrating a setting example of the teaching signal according to the first example embodiment.

In step S21, the detection region setting unit 113 sets the detection region 340 in which the teaching signal is required to be set in the image 300. An example of the detection region 340 that can be set is illustrated in FIG. 6. In the example in FIG. 6, as candidates of the detection region 340, nine detection regions 340 arranged in 3 rows and 3 columns in the image 300 are illustrated as region 1 to region 9. In this step, for example, one of the region 1 to the region 9 is selected and set as the detection region 340 in which a teaching signal is required to be set. In the description below, it is assumed that the region 1 is selected. As illustrated in FIG. 6, the region 1, the region 2, the region 3, the region 4, and the region 7 do not overlap with the target region 330. In contrast, the region 5, the region 6, the region 8, and the region 9 partially overlap with the target region 330. Note that, in view of the efficiency of processing, easier arrangement of the regions without gaps, or the like, the detection region 340 is preferably rectangular.

In step S22, to calculate a relevance, the relevance calculation unit 114 reads and acquires the target region 330 from the target region storage unit 130. In step S23, the relevance calculation unit 114 calculates the relevance between the detection region 340 set in step S21 and the target region 330 read in step S22. The relevance can be, for example, a value corresponding to the area of a portion where the detection region 340 overlaps with the target region 330. More specifically, the relevance can be a ratio of the area of the overlapping part of the detection region 340 and the target region 330 relative to the detection region 340. In this case, since the region 1 does not overlap with the target region 330, the ratio of the overlapping area is 0, and the relevance is calculated as 0.

In step S24, the teaching signal calculation unit 115 calculates the teaching signal based on the relevance calculated in the relevance calculation unit 114. The teaching signal is a signal serving as a teacher in learning image recognition and indicates what degree the detection target 310 is included in the detection region 340 in the image for learning. In the present example embodiment, the teaching signal is calculated from the relevance based on a logistic function as illustrated in FIG. 7. The logistic function is a function indicated in Equation 1 below.

[Math. 1]

$$y = \frac{a}{1 + b \cdot \exp(-cx)} \quad \text{Equation (1)}$$

In Equation 1, the variable x indicates a relevance, and the variable y indicates a teaching signal. The values a, b, and c are parameters that determine the shape of the logistic function. In the present example embodiment, the values of a, b, and c are set such that the value of the teaching signal is close to 0 when the relevance is 0, and the value of the teaching signal is close to 1 when the relevance is 1. In the region 1, since the relevance is 0, the value of the teaching signal is approximately 0. In the present example embodiment, this value is assumed to be 0.001.

Note that the function used for calculation of the teaching signal may be at least a function that can take three values that respectively indicate a case where the detection region 340 and the target region 330 completely overlap with each other, a case where the detection region 340 and the target region 330 do not overlap with each other, and a case where the detection region 340 and the target region 330 partially overlap with each other. In other words, the function may correspond to a pattern-classification that includes the three cases described above. To reflect the overlap degree between the detection region 340 and the target region 330 more accurately in the teaching signal, however, the function is preferably a continuous function in which a relevance is used as a variable. The logistic function is a function that can continuously take values between approximately 0 and approximately 1 and thus preferably satisfies the condition described above. The function used for calculation of the teaching signal is not limited to the logistic function and may be, for example, a function using a hyperbolic tangent function, a linear function, or the like.

In step S25, the teaching signal setting unit 116 sets the teaching signal calculated in the teaching signal calculation unit 115 to the detection region 340 set in the detection region setting unit 113. In the present example, the teaching signal setting unit 116 sets a value of 0.001 as the teaching signal corresponding to the region 1. This teaching signal indicates that the detection target 310 is not included in the region 1.

In step S26, the CPU 201 determines whether or not there is another region in which the teaching signal is required to be set in the image 300. This determination may be, for example, based on input by the user or may be made by the CPU 201 reading information related to a pre-set region from the storage medium 204 or the like. If there is another region in which the teaching signal is required to be set (step S26, YES), the process of step S21 is again performed. If there is no other region in which the teaching signal is required to be set (step S26, NO), the setting operation of the teaching signal ends. When the setting of the teaching signal ends, the teaching signal and the image 300 are stored in the learning data storage unit 140 as learning data. This learning data is used for machine learning in the learning unit 150.

The teaching signal may be sequentially set by repeating the process from step S21 to step S26 for a plurality or all of the region 1 to the region 9 described above. In this case, the setting of the teaching signal may be performed by a so-called sliding window in which the process is sequentially performed by sliding a region on the image 300. FIG. 8 is a table illustrating a setting example when a teaching signal is set for all of the region 1 to the region 9. Since the region 1, the region 2, the region 3, the region 4, and the region 7 do not overlap with the target region 330, the values of the teaching signal thereof are 0.001 that are approximately 0. The region 5, the region 6, the region 8, and the region 9 partially overlap with the target region 330 and thus are larger than 0.001 and less than 1. Further, a larger value of the teaching signal indicates a larger overlap degree between the detection region 340 and the target region 330.

The reason for setting a teaching signal that may take three or more values including not only values close to 0 and 1 but also values between 0 and 1 in the present example embodiment will be described below in more detail.

When the teaching signal takes two values such as 0 and 1 or the like, learning to determine an image including a detection target in a detection region and an image including no detection target in the detection region is to be performed, and thus a region sufficiently including the detection target and a region including no detection target will be set for the detection region of learning data. When image recognition is performed by using a learning model obtained by machine learning based on such learning data, the detection accuracy may be insufficient in a state where only a portion of the detection target is included in the detection region at image recognition (in other words, a portion of the detection target is lost). In such a case, to obtain sufficient detection accuracy, a method of enlarging the detection region so as to include all of the detection target is also conceivable. Because of excessive detection region, however, the width of sliding is reduced when a sliding window is used, for example, and thereby there is an adverse effect such as a long detection time.

In contrast, in the present example embodiment, since the teaching signal that may take three or more values, including not only values close to 0 and 1 but also a value between 0 and 1 is set, it is possible to set a state where only a portion of the detection target is included in the detection region. By using such learning data, it is possible to perform learning adapted to a state where a portion of the detection target is lost at image recognition described above, and thereby the influence of the problem described above can be reduced.

Therefore, according to the present example embodiment, it is possible to provide an image processing device (for example, an image recognition system, a machine learning system, and a learning data generation device that may be included in the image recognition system or the machine learning system) that can set a teaching signal for machine learning more preferably.

Second Example Embodiment

Figure 9:
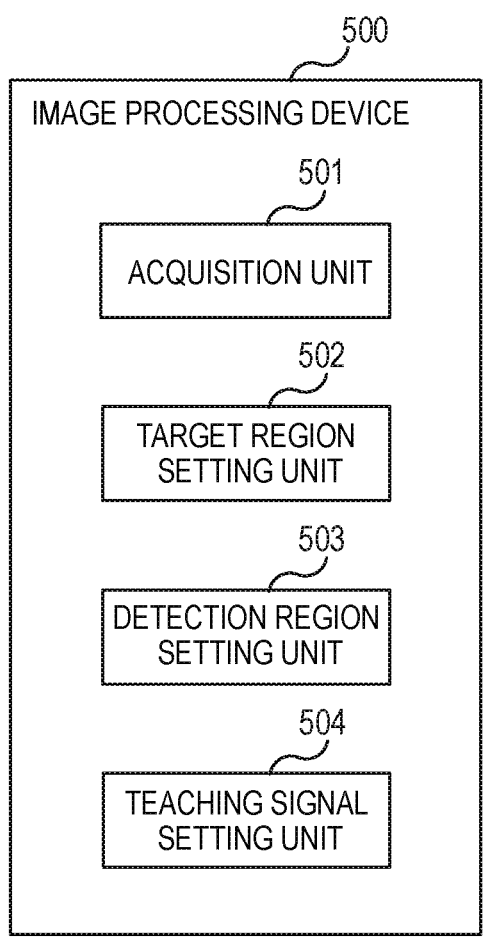
FIG. 9 is a function block diagram of an image processing device according to a second example embodiment.

The device described in the example embodiment described above can also be configured as follows. FIG. 9 is a functional block diagram of an image processing device 500 according to a second example embodiment. The image processing device 500 has an acquisition unit 501 that acquires an image for learning used for machine learning. The image processing device 500 further has a target region setting unit 502 that sets a target region including a detection target to an image. The image processing device 500 further has a detection region setting unit 503 that sets a detection region in which a teaching signal is required to be set to the image. The image processing device 500 further has a teaching signal setting unit 504 that sets a teaching signal that may take three or more values in accordance with a relevance between the detection region and the target region to the detection region.

According to the present example embodiment, it is possible to provide an image processing device that can set a teaching signal for machine learning more preferably.

Modified Example Embodiments

The present invention is not limited to the example embodiments described above and may be modified appropriately within the scope not departing from the spirit of the present invention.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or more components included in the example embodiments described above may be a circuit such as an Application Specific Integrated Circuit (ASIC), a Field Programmable Gate Array (FPGA), or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments includes an example that operates on an operation system (OS) to perform a process in cooperation with another software or a function of an add-in board without being limited to an example that performs a process by an individual program stored in the storage medium.

Note that each of the example embodiments described above merely illustrates an example of embodiment in implementing the present invention, and the technical scope of the present invention should not be construed in a limiting sense by these example embodiments. That is, the present invention can be implemented in various forms without departing from the technical concept or the primary features.

The whole or part of the example embodiments disclosed above can be described as, but not limited to, the following supplementary notes.

(Supplementary Note 1)

An image processing device comprising:

an acquisition unit that acquires an image for learning used for machine learning;

a target region setting unit that sets, to the image, a target region including a detection target;

a detection region setting unit that sets, to the image, a detection region in which a teaching signal is required to be set; and a teaching signal setting unit that sets, to the detection region, a teaching signal that may take three or more values in accordance with a relevance between the detection region and the target region.

(Supplementary Note 2)

The image processing device according to supplementary note 1, wherein the relevance is a value in accordance with an area of a portion in which the detection region overlaps with the target region.

(Supplementary Note 3)

The image processing device according to supplementary note 1 or 2, wherein the teaching signal is a value calculated from a continuous function in which the relevance is used as a variable.

(Supplementary Note 4)

The image processing device according to supplementary note 3, wherein the continuous function is a logistic function.

(Supplementary Note 5)

The image processing device according to any one of supplementary notes 1 to 4, wherein the detection region setting unit sets the detection region by using a sliding window.

(Supplementary Note 6)

The image processing device according to any one of supplementary notes 1 to 5, wherein the target region has a shape such that at least a portion of the target region circumscribes the detection target.

(Supplementary Note 7)

The image processing device according to any one of supplementary notes 1 to 6, wherein the target region is rectangular.

(Supplementary Note 8)

The image processing device according to any one of supplementary notes 1 to 7, wherein the detection region is rectangular.

(Supplementary Note 9)

An image processing method comprising:

acquiring an image for learning used for machine learning;

setting, to the image, a target region including a detection target;

setting, to the image, a detection region in which a teaching signal is required to be set; and setting, to the detection region, a teaching signal that may take three or more values in accordance with a relevance between the detection region and the target region.

(Supplementary Note 10)

A storage medium storing a program that causes a computer to execute:

acquiring an image for learning used for machine learning;

setting, to the image, a target region including a detection target;

setting, to the image, a detection region in which a teaching signal is required to be set; and setting, to the detection region, a teaching signal that may take three or more values in accordance with a relevance between the detection region and the target region.

This application is based upon and claims the benefit of priority from Japanese Patent Application No. 2017-048321, filed on Mar. 14, 2017, the disclosure of which is incorporated herein in its entirety by reference.

REFERENCE SIGNS LIST 110 learning data generation unit
111 image acquisition unit
112, 502 target region setting unit
113, 503 detection region setting unit
114 relevance calculation unit
115 teaching signal calculation unit
116, 504 teaching signal setting unit
120 image storage unit
130 target region storage unit
140 learning data storage unit
150 learning unit
160 learning model storage unit
200 computer
201 CPU
202 RAM
203 ROM
204 storage medium
205 input device
206 display device
207 network interface
300 image
310 detection target
320 designated region
330 target region
340 detection region
500 image processing device
501 acquisition unit

What is claimed is:

1. An image processing device comprising:

a processor; and memory storing executable instructions that, when executed by the processor, causes the processor to perform as:

an acquisition unit that acquires an image for learning used for machine learning;

a target region setting unit that sets, to the image, a target region including a detection target;

a detection region setting unit that sets, to the image, a detection region in which a teaching signal is required to be set; and a teaching signal setting unit that sets, to the detection region, a teaching signal of the machine learning and calculated from a continuous function in which an overlap degree between the detection region and the target region is used as input valuables of the continuous function, wherein the overlap degree may take values respectively correspond to a case where the detection region and the target region completely overlap with each other, a case where the detection region and the target region do not overlap with each other, and a case where the detection region and the target region partially overlap with each other.

2. The image processing device according to claim 1, wherein the teaching signal is set in accordance with a relevance that is a value in accordance with an area of a portion in which the detection region overlaps with the target region.

3. The image processing device according to claim 1, wherein the continuous function is a logistic function.

4. The image processing device according to claim 1, wherein the detection region setting unit sets the detection region by using a sliding window.

5. The image processing device according to claim 1, wherein the target region has a shape such that at least a portion of the target region circumscribes the detection target.

6. The image processing device according to claim 1, wherein the target region is rectangular.

7. The image processing device according to claim 1, wherein the detection region is rectangular.

8. An image processing method comprising:

acquiring an image for learning used for machine learning;

setting, to the image, a target region including a detection target;

setting, to the image, a detection region in which a teaching signal is required to be set; and setting, to the detection region, a teaching signal of the machine learning and calculated from a continuous function in which an overlap degree between the detection region and the target region is used as input valuables of the continuous function, wherein the overlap degree may take values respectively correspond to a case where the detection region and the target region completely overlap with each other, a case where the detection region and the target region do not overlap with each other, and a case where the detection region and the target region partially overlap with each other.

9. A non-transitory storage medium storing a program that causes a computer to execute:

acquiring an image for learning used for machine learning;

setting, to the image, a target region including a detection target;

setting, to the image, a detection region in which a teaching signal is required to be set; and setting, to the detection region, a teaching signal of the machine learning and calculated from a continuous function in which an overlap degree between the detection region and the target region is used as input valuables of the continuous function, wherein the overlap degree may take values respectively correspond to a case where the detection region and the target region completely overlap with each other, a case where the detection region and the target region do not overlap with each other, and a case where the detection region and the target region partially overlap with each other.

* * * * *